United States Patent
Counterman

(10) Patent No.: US 8,495,720 B2
(45) Date of Patent: Jul. 23, 2013

(54) METHOD AND SYSTEM FOR PROVIDING MULTIFACTOR AUTHENTICATION

(75) Inventor: Raymond Counterman, Canton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 471 days.

(21) Appl. No.: 12/775,018

(22) Filed: May 6, 2010

(65) Prior Publication Data

US 2011/0277025 A1    Nov. 10, 2011

(51) Int. Cl.
*G06F 21/00* (2006.01)
(52) U.S. Cl.
USPC ........... 726/8; 705/68; 713/159; 709/225; 709/217; 455/433
(58) Field of Classification Search
USPC .................................................. 726/6, 8
See application file for complete search history.

(56) References Cited

U.S. PATENT DOCUMENTS

| | | | | |
|---|---|---|---|---|
| 7,813,730 | B2* | 10/2010 | Patel et al. | 455/433 |
| 8,091,122 | B2* | 1/2012 | Guo et al. | 726/6 |
| 2004/0250085 | A1* | 12/2004 | Tattan et al. | 713/186 |
| 2005/0091338 | A1* | 4/2005 | de la Huerga | 709/217 |
| 2007/0118891 | A1* | 5/2007 | Buer | 726/8 |
| 2009/0292641 | A1* | 11/2009 | Weiss | 705/66 |
| 2009/0327729 | A1* | 12/2009 | Rhodes et al. | 713/171 |
| 2010/0122082 | A1* | 5/2010 | Deng et al. | 713/159 |

OTHER PUBLICATIONS

Group Release Authentication algorithm| http://www.3gpp.org/ftp/tsg_saA/WG3_Security/TSGS3_25_Munich/Docs/PDF/S3-020510.pdf|2002|Ericsson.*

* cited by examiner

*Primary Examiner* — Taghi Arani
*Assistant Examiner* — Mahfuzur Rahman

(57) ABSTRACT

An approach is provided for using multifactor authentication to access multiple services. A determination is made that a user equipment has been authenticated for an access network. An identifier corresponding to the user equipment is received. An alias identifier is generated based on the received user equipment identifier for use in combination with a universal user identifier to authenticate a user corresponding to the user equipment for accessing a plurality of services via the access network.

16 Claims, 8 Drawing Sheets

METHOD AND SYSTEM FOR PROVIDING MULTIFACTOR AUTHENTICATION

BACKGROUND INFORMATION

The ubiquity of data networking has enabled the emergence of a vast array of on-line services. These services are independently developed and managed by numerous service providers. Users who access data and services on the differing computer networks and service providers correspondingly possess numerous user accounts. Because the services encompass business, entertainment, and social applications, security concerns vary with respect to the form of the user identities and passwords. Not surprisingly, the management of these user account identities and passwords is extremely challenging for users, who are required to memorize a large amount of authentication information (e.g., user identifier (ID), password, etc.) that are, most times, not intuitive. Depending on the service, security may require more complex (i.e., "stronger") passwords, which further burdens the users' ability to accurately recall the proper authentication information. However, the use of simple (or the same) authentication information to access different services increases the security risks at both the user level as well as the network level.

Based on the foregoing, there is a need for an approach that permits simple yet strong authentication for users to access multiple network and/or on-line services.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION OF THE DRAWINGS

A preferred method and system for providing multifactor authentication of users to access multiple services is described wherein a user needs only to have a single digital identity and a single set of credentials and wherein the user can get authenticated, with high level of confidence, by only one interaction with the authentication system. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a multifactor authentication procedure that complies with the OpenID® protocols, it is contemplated that these embodiments have applicability to other equivalent protocols.

Figure 1:
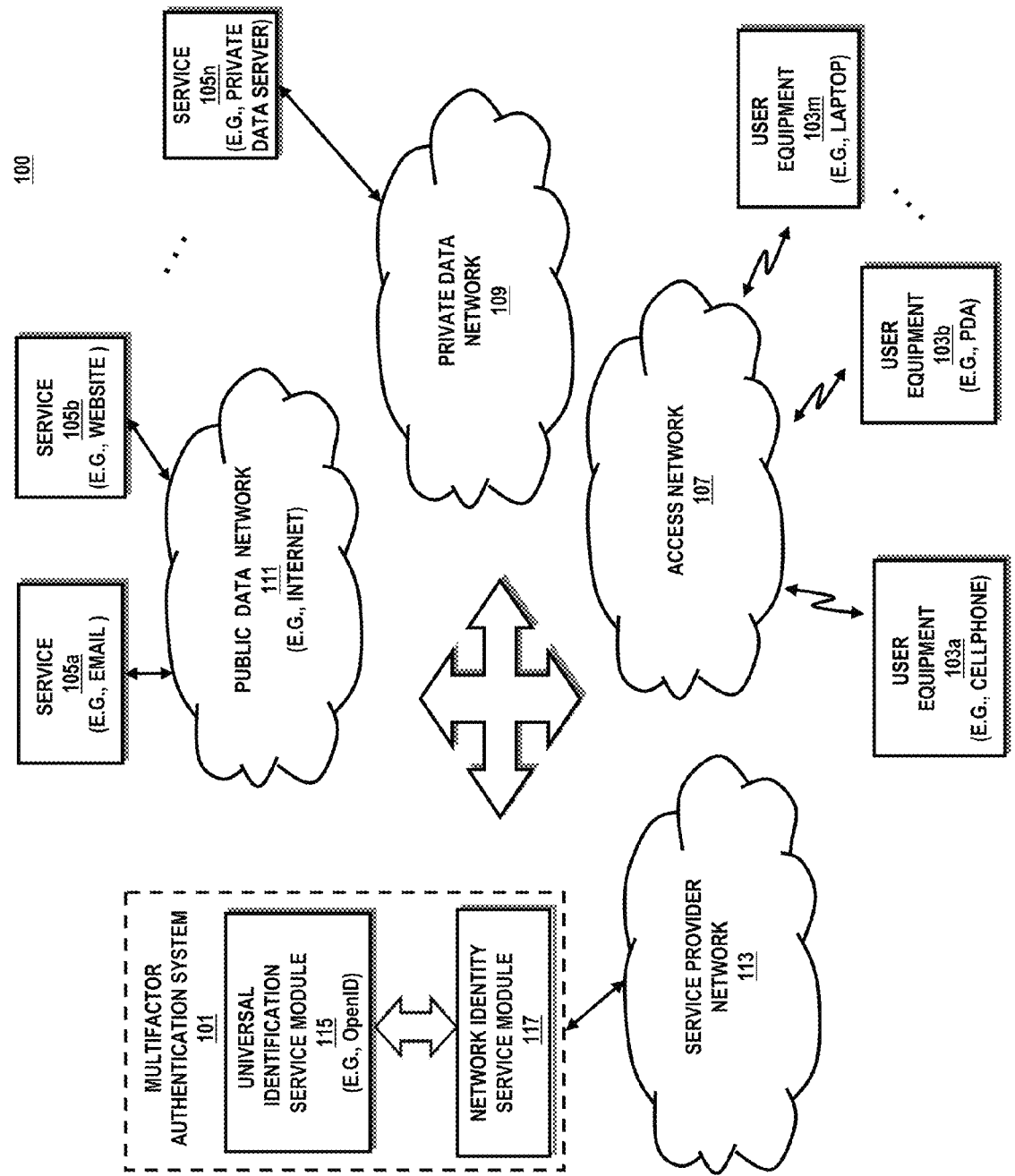
FIG. 1 is a diagram of a system capable of providing multifactor authentication, according to an exemplary embodiment.

FIG. 1 is a diagram of a system capable of providing multifactor authentication, according to an exemplary embodiment. For illustrative purposes, system 100 includes a multifactor authentication system 101 configured to provide a two-factor authentication service that separates network-based authentication from online-based (e.g., web-based) authentication. In this manner, system 101 enables users operating one or more user equipment (user devices) 103a-103m to conveniently access various network and/or on-line services 105a-105n. Multifactor authentication system 101 performs user authentication using the following services: a universal identification service, and a network identity service. Although shown as a single system or platform 101 providing these sub-services, it is contemplated that there can be multiple deployments of such sub-services, in which each of the sub-services can be managed by separate entities.

As shown, user equipment may be any computing device capable of communicating over an access network 107; moreover, in certain embodiments, user devices may be configured to perform voice communications. Hence, such user device may be any suitable computing device, such as a Voice over Internet Protocol (VoIP) phone, skinny client control protocol (SCCP) phone, session initiation protocol (SIP) phone, IP phone, personal computer, softphone, workstation, terminal, server, etc. Furthermore, these devices may be mobile devices, such as a cellular phone, radiophone, satellite phone, smart phone, wireless phone, personal digital assistant (PDA), pocket personal computer, tablet, set-top box, customized hardware, etc. User equipment 103a-103m can communicate with services 105a-105n, which can include email, website, data repository (e.g., data server), on-line store, social network, etc. In some embodiments, UE 103 is capable of storing the information needed in the authentication process and transmitting that information to the authentication service provided by system 101.

According to certain embodiments, access network 107 may include one or more networks, such as data network, telephony network, and/or wireless network, can interact with other data networks, e.g., private data network 109 and public data network 111 (e.g., Internet). These networks 107-111 may be any suitable wireline and/or wireless network, and be managed by one or more service providers. For example, telephony network within access network 107 may include a circuit-switched network, such as the public switched telephone network (PSTN), an integrated services digital network (ISDN), a private branch exchange (PBX), or other like network. The wireless network may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, the data network, as part of the access network 107, may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 107-111 may be completely or partially contained within one another, or may embody one or more of the aforementioned infrastructures.

Furthermore, multifactor authentication system 101 may be provided as a managed service as part of a service provider network 113 may embody circuit-switched and/or packet-switched networks that include facilities to provide for transport of circuit-switched and/or packet-based communications. It is further contemplated that service provider network 113 can encompass one or more networks of the access network 107, and thus may include components and facilities to provide for signaling and/or bearer communications between the various components or facilities of system 100.

According to certain embodiments, multifactor authentication system 101 includes a universal identification service module 115 and a network identity service module 117 for providing a simple, yet strong authentication procedure. These modules 115 and 117 are more fully described with respect to FIG. 2.

It is recognized that with the explosive expansion of computer and communications networks, greater numbers of users avail themselves of different kinds of services, which are offered by a variety of entities. Many of these services may require a high level of security, whereby the users are required to undergo an authentication procedure to verify their identities before they can use the services. For example, financial services involve accessing highly sensitive data; e.g., banking customers can log onto a banking website to check their account balances, transfer money, pay bills, etc. In such a case, the importance of strong authentication for accessing an account is evident. Unfortunately, the typical use of user name or identity (ID) and a password, has proven to be a weak form of authentication. This problem becomes exacerbated by the fact that most users tend to use simple and similar user IDs and passwords to access a host of services for ease of memorization. For example, a user who routinely is "surfing" the World Wide Web might, out of convenience, choose the same user ID and/or password for email accounts, social networking accounts, banking and business related accounts. Such uniformity can pose a serious security threat in that if the single ID and password is obtained by an unauthorized user, this user might readily access a range of personal and financial information.

On the other hand, because a typical user maintains numerous accounts with a variety of service providers, the handling of authentication information for these various accounts rapidly becomes unmanageable. Consequently, a more convenient and efficient authentication scheme is needed, while ensuring that security requirements are satisfied. In recognition of this, multifactor authentication system 101 permit users to access the multitude of services 105a-105n with a single user ID and single set of credentials without any security compromise, according to certain embodiments.

Strong authentication can be achieved by use of multiple factors in an authentication process. According to certain embodiments, three factors to consider in the process of authentication are as follows: 1) something the user possesses (e.g., a mobile phone); 2) something the user knows (e.g., password); and 3) something that is a trait of the user (e.g., biometrics such a finger print or iris shape). Typically, the use of any of the two factors is considered strong security. As seen in FIG. 1, a user's interaction with the services 105 is through the use of a user equipment (UE) 107, which can serve as an authentication factor.

Generally, the services 105 involve users setting up an account. Account set-up includes creating a user ID, along with a set of credentials and authentication options. These credentials can specify a strong password. In some embodiments, the user credentials can also include a factor relating to who the user is, for example a biometric factor. The authentication options can include two or more factors. By way of example, the authentication options may encompass a question-answer scheme, whereby the user can register a sophisticated set of questions and answers that can be prompted to the user during the authentication process.

In some embodiments, users register with the multifactor authentication service provided by system 101. As part of the registration process, the user can specify a list of services, e.g., email services, web-based services, on-line financial accounts, on-line stores, social networking, on-line commerce sites, websites, etc., that the user wants to use together with a user ID and associated credentials the user has registered with those services. It is contemplated that a user can have different sets of persona and different sets of credentials to access different categories of services. The services can also include network services, such as file transfer, Intranet access, etc. In some embodiments, the multifactor authentication system 101 is capable of providing different kinds of persona for the same user. For example, a user can possess different user ID's as well as different credentials or authentication methods depending on the type of service and/or context. The multifactor authentication system 101 can upon a request by another service, and after authenticating the user, convey that the user is authenticated to the requesting service.

After the initial set-up or registration, the user undergoes a strong authentication process with the multifactor authentication service. In one embodiment, this authentication remains valid for a predetermined period of time (known as a "validity period"); after which, the authentication with the multifactor authentication service expires, and the user has to be re-authenticated. By way of example, the multifactor authentication system 101, upon authenticating the user provides the user with some information that specifies the validity period. After the authentication, the user equipment 103 stores, in an exemplary embodiment, a token that is generated based on the authentication process. This token is used to access the services 105.

During the validity period, system 100 allows the user to conveniently access the services 105 through use of a single user ID. Under this arrangement, there is no need for the user to communicate any other set of credentials with the respective services 105, thereby simplifying the user authentication process. Namely, the user merely indicates, directly or indirectly, to the multifactor authentication service provider (which has responsibility for authenticating the user) which of the one or more services 105 are of interest.

Additionally, UE 103 can employ its own authentication process to authenticate the user before the user can operate the UE 103. For example, a mobile phone or PC might require the user to enter a personal identification number (PIN) or a password or any other credentials each time the user wants to use them or after certain amount of time passes idly. In other instances, the credential information may include any one or combination of a birth date, an account number (e.g., bank, credit card, billing code, etc.), a social security number (SSN), an address (e.g., work, home, internet protocol (IP), media access control (MAC), port, etc.), or telephone listing (e.g., work, home, cellular, etc.), as well as any other form of uniquely identifiable datum, e.g., bearer tag identifier, etc.

It is contemplated that the user might interact with the UE 103 in various different ways. For example, the user might enter information via a standard keyboard, a touch screen, or voice recognition system or any other means which allows the user to transfer information and instructions to the UE 103.

In some embodiments, UE 103 might include or can gain access to a biometric identification mechanism to collect some biometrics of the user. For example, UE 103 might include biometric identification mechanisms to conduct, for instance, a retina scan, facial scan, voice print, finger print, palm vein reader, etc. According to certain embodiments, once such initial authentication is complete, additional authentication mechanism can be invoked, such as passphrase challenge. Also, the biometrics of the user can be used by the multifactor authentication service to perform strong authentication in situations where extremely high level of security is needed.

Figure 2:
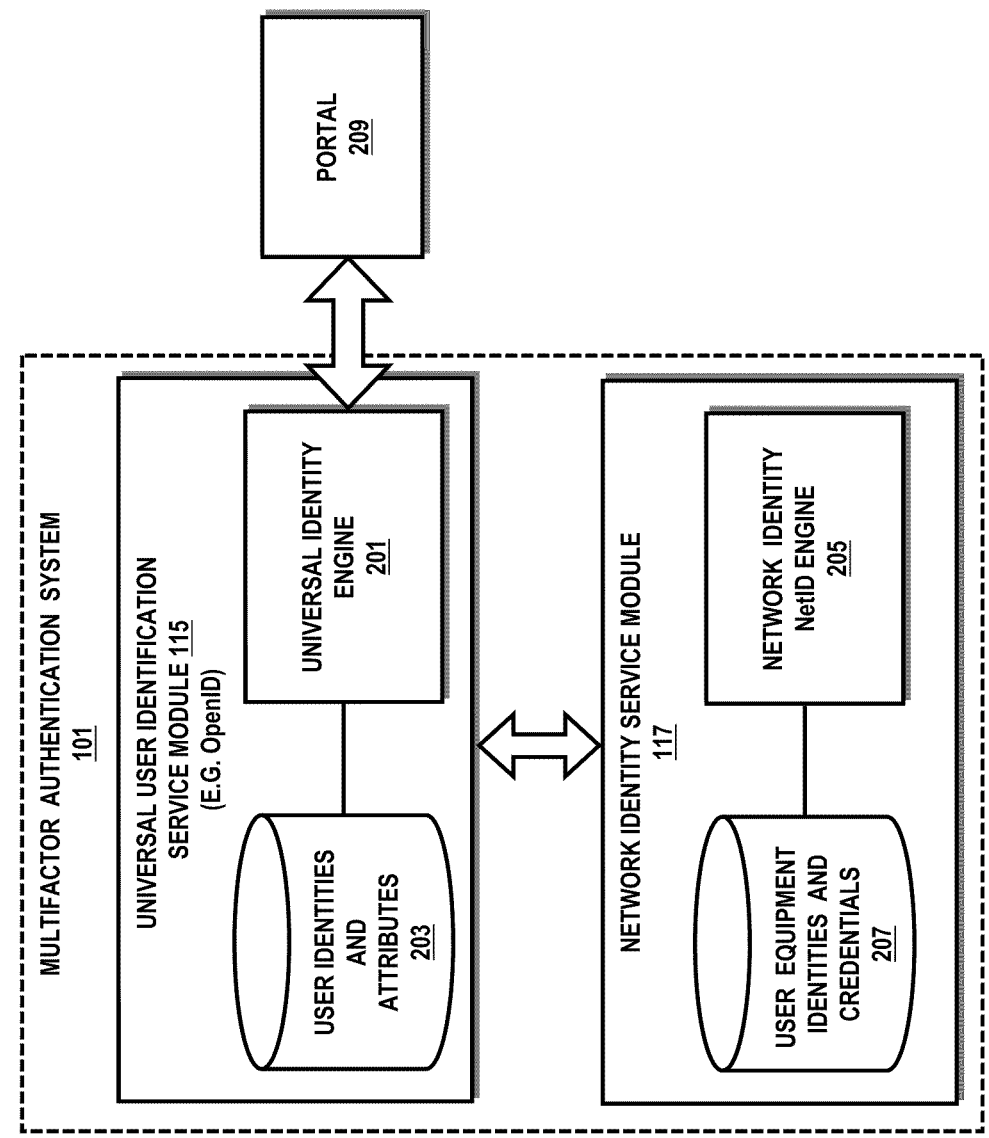
FIG. 2 is a diagram showing the components of a multifactor authentication system, according to an exemplary embodiment.

FIG. 2 is a diagram showing the components of a multifactor authentication system, according to an exemplary embodiment. In this example, system 101 provides a multifactor authentication service that comprises two sub-services: universal identification service and Network Identity (NetID) service. These sub-services are performed by the corresponding modules: universal identification service module 115 and Network Identity (NetID) service module 117. In the context of the World Wide Web, this NetID service can also be referred to as a "Web Identity" service. As seen, module 115 includes a universal identity engine 201 and a database 203 configured to store data relating to user identities and attributes. The universal identity engine 201 interacts with the user equipment 103 to obtain information from the user. It is contemplated that in some embodiments the universal identification service 115 can include other components, or its components, engine 201 and database 203, can be unified. Network Identity (NetID) service module 117 comprises a network identity (NetID) engine 205 coupled to a database 207 that is configured to store data pertaining to user equipment identities and associated credentials. These sub-services of system 101, according to certain embodiments, can be managed and supplied by different service providers. The architecture of multifactor authentication system 101 allows the separation of these two sub-services, thereby allowing the user to choose the best service provides for each of the two sub-services.

The universal identification service module 115, among other functions, specifies a universal identity for a user to participate in one or more of the services 105a-105n. According to certain embodiments, universal identification service module 115 designates a single user ID and one set of user credentials; however, as mentioned, different user ID's can be specified for different personas for the identical user. The universal ID is effectively "accepted" by multiple services 105, even though such services 105 can be offered by different service providers. As mentioned, before accessing the services 105, the user first requests to be authenticated by the multifactor authentication system 101. After undergoing a successful authentication process, the user remains authenticated for the validity period. This validity period can be set by the user specified or determined by the service provider; additionally or alternatively, the period can be dictated or negotiated with the services 105 as well as other constraints. During this period of time, the user can conveniently access one or more of the services 105 simply by supplying the universal ID and possibly a single set of credentials.

According to one embodiment, the universal identification service 115 can be based on the OpenID standards, and thus, behave as an OpenID service provider. In one embodiment, OpenID services can be obtained through a portal 209 (which may be reached using a uniform resource locator (URL)).

OpenID is a publically available, decentralized and open protocol standard for authenticating users and aims at providing a simple solution to the problem of web site authentication. These protocols eliminate the need for multiple usernames and passwords by enabling Internet users to log on to many different web sites with a single digital identity—the user's OpenID Identifier. Under these standards, the user or UE 103 is aware of a universal resource locator (URL) that accepts OpenID authentication protocol message. The OpenID Service is one in which the user creates an account, establishes a web identity (OpenID Identifier), and selects the methods used to sign-in to the OpenID Service provider. This sign-in process is an authentication step in which the users, known to the OpenID Service provider by their OpenID Identifiers, provides their credentials. The end-users must prove their identities to the OpenID Service. With OpenID, users only need to know their OpenID Identifiers and one set of credentials. That is, once authenticated with the OpenID Service provider, the user only needs to provide their OpenID Identifier to a web-site to log-on or sign-in, such as "john-smith.myopenid.com."

Regarding the Network Identity (NetID) service module 117, this module has the responsibility for authenticating the user at a network level, whereby the user equipment associated with the user is authenticated to permit access the network. In one embodiment, the NetID service can be provided by the same provider that provides network access to the user. For example, a wireless company that provides the user with smart phone WiFi service may provide the network identity service. Consequently, multiple NetID service providers may exist in system 100.

By way of example, assuming a user can access the services 105a-105n (of FIG. 1) via a variety network access providers (associated with access network 107), the user can thus have several NetID service providers corresponding to the access providers. In this case, all the NetID services will exchange information with the universal identification service provided by module 115. In certain embodiments, the NetID service provider(s) can be a different entity (or entities) from any of the access network providers; however, under these scenarios, the NetID service can obtain the required information directly from the network access provider(s).

The two sub-services modules 115 and 117 interoperate and exchange information to perform the multifactor authentication procedure. It is contemplated that these two distinct services may be managed by separate service providers. If the sub-services are provided by the same provider, then a direct communication channel may be established internal to the service provider; otherwise, the communication can be over anyone of the networks (e.g., public data network 111) of system 100. For example, external communications between the universal authentication service module 115 and the network authentication service module 117 can according to such protocols as Security Assertion Markup Language (SAML).

In some embodiments, the network identity service can be integrated with the access network 107. Under this scenario, access network 107 can include network elements/components that are configured to authenticate user equipment (device) 103 and provide access control; and thus, these network elements can serve as the network identity service. Moreover, a range of protocols are used to communicate between the user equipment 103 and these components (not shown). User equipment 103 or the universal identification service module 115 can communicate with the NetID service using a variety of different methods and protocols. In one embodiment, Transmission Control Protocol/Internet Protocol (TCP/IP) can be used, wherein a fully qualified domain name is employed to reach and communicate with this service, i.e., NetID.com.

Before the user is authenticated by the universal identification service, the UE identity is established or authenticated at the network level by the NetID service. According to certain embodiments, the NetID service can involve use of the Extensible Authentication Protocol (EAP) for some wireless networks. In particularly, for 3G and 4G wireless networks, the user equipment 103 can be authenticated using EAP-AKA (UMTS Authentication and Key Agreement). In one embodiment, the access network trust assertion is based on the service provider's configuration of the user equipment's IP address. For example, successful user equipment authentication enables the user equipment to engage in IP communication services.

It is noted that varying types and forms of identification for the user equipment 103 can be employed for the NetID service. Such identification can be referred to as "user equipment identity," which specifies a device identity or name that is utilized for the authentication process to verify the user equipment for the particular access network 107. Examples of user equipment identities include the following: IMS (IP Multimedia Subsystem) Private Identity (3GPP); Media Access Control address (MAC address); an IP address; a username provisioned in the UE 103; Mobile Station ISDN Number (MSISDN); Mobile Identification Number (MIN); International Mobile Equipment Identity (IMEI); Electronic Serial Number (ESN). In certain embodiments, the user equipment identity along with a shared secret can be used by the network 107 to authenticate the device 103, and provide access to the network 107. For instance, as mentioned, in a wireless access network, EAP-AKA may be used to authenticate the user equipment 103 before the user equipment 103 is granted access to the network 107 and given an IP address for IP communication services.

The universal identification service module 115 can communicate with the NetID service module 117, the UE identity and associated credentials can also be used in the authentication of the user (as opposed to the UE 103) to access services 105. The multifactor authentication procedure is more fully described below.

Figure 3:
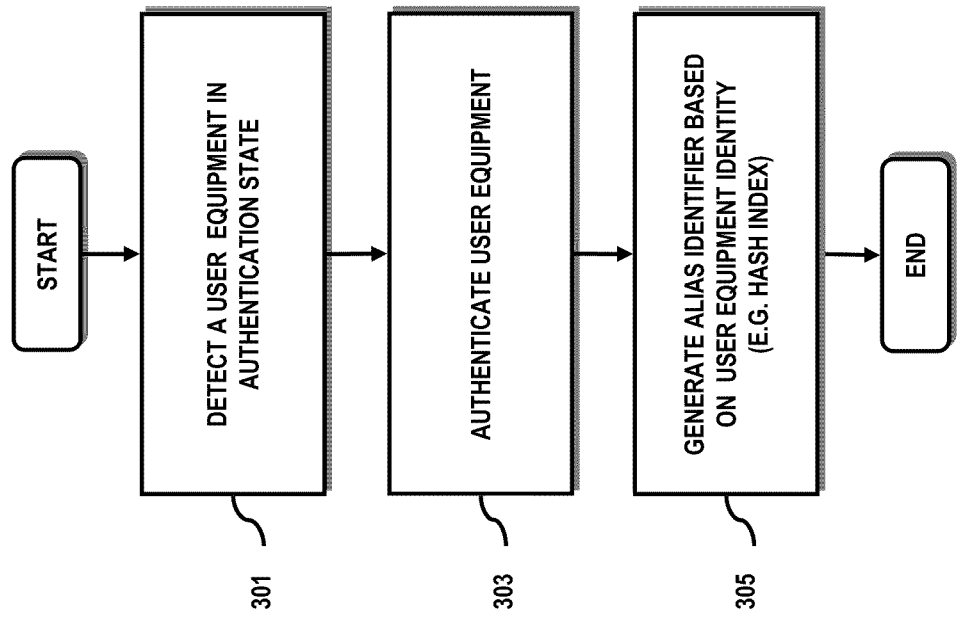
FIG. 3 is a flowchart of a process for providing authentication, according to an exemplary embodiment.

FIG. 3 is a flowchart of a process for providing authentication, according to an exemplary embodiment. For the purposes of explanation, the authentication process is described with respect to the multifactor authentication system 101 of FIGS. 1 and 2. In step 301, the NetID service detects a user equipment 103 is unauthenticated. By way of example, this authentication state may be caused by the power-on of the device; a physical connection of the device to the network; or a time-out (which expired from the previous authentication state). In step 303, the user equipment 103 is authenticated; this involves the UE 103 communicating with the NetID service module 117 to provide the UE identity and corresponding credentials. The network identity service module 117 processes the authenticated UE identity to create an alias identity or identifier ("UE Alias"), as in step 305. The NetID service module 117 stores the established UE credentials in database 207. According to certain embodiments, the UE Alias is a temporary transaction identifier resulting from the successful authentication of the UE 103 by the NetID service module 117. That is, the UE Alias can be assigned an expiration value (i.e., validity period). The UE 103 can store this UE Alias for subsequent use in the authentication process to be performed by the universal user identification service module 115.

In one embodiment, the UE Alias is the result of an irreversible transformation process or operation. For example, the UE Alias can be a hash index resulting from hashing of the UE identity and/or other information relating to the user equipment 103, e.g., IP address of the UE 103. According to one embodiment, the use of the UE identity, rather than the UE Alias, in combination with a universal user identifier (e.g., OpenID identifier) can serve to authenticate the user for accessing one or more of the services 105. As used herein, the term "equipment identifier" can denote either the UE identity or UE Alias.

It is contemplated that for increased security, the NetID service module 117 can request information from the user for use in authenticating the user equipment 103. For example, the user may possess an account with the NetID service, and the user can be authenticated by the NetID service by validating information about the user (e.g., biometrics of the user). Furthermore, the NetID service module 117 can compare the UE's requested credentials against a stored set within database 207.

Figure 4A:
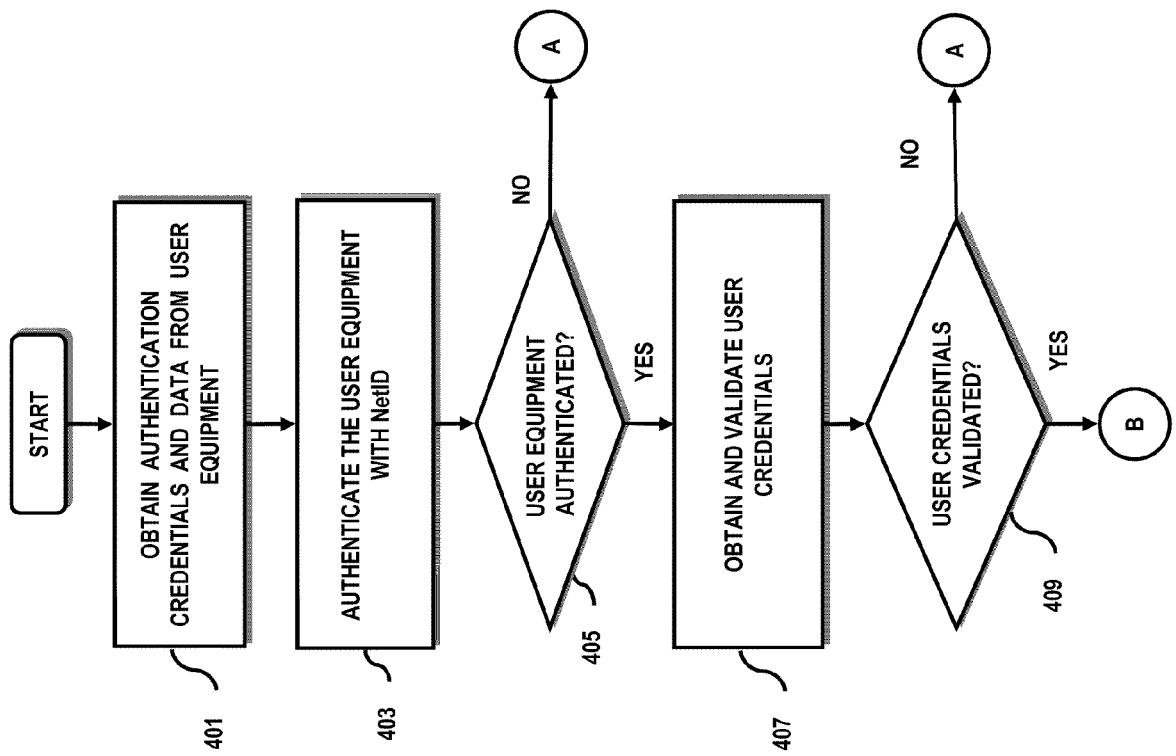
FIGS. 4A and 4B are flowcharts of an authentication process involving the interaction of a universal user authentication service and a network identity service, according to an exemplary embodiment.
Figure 4B:
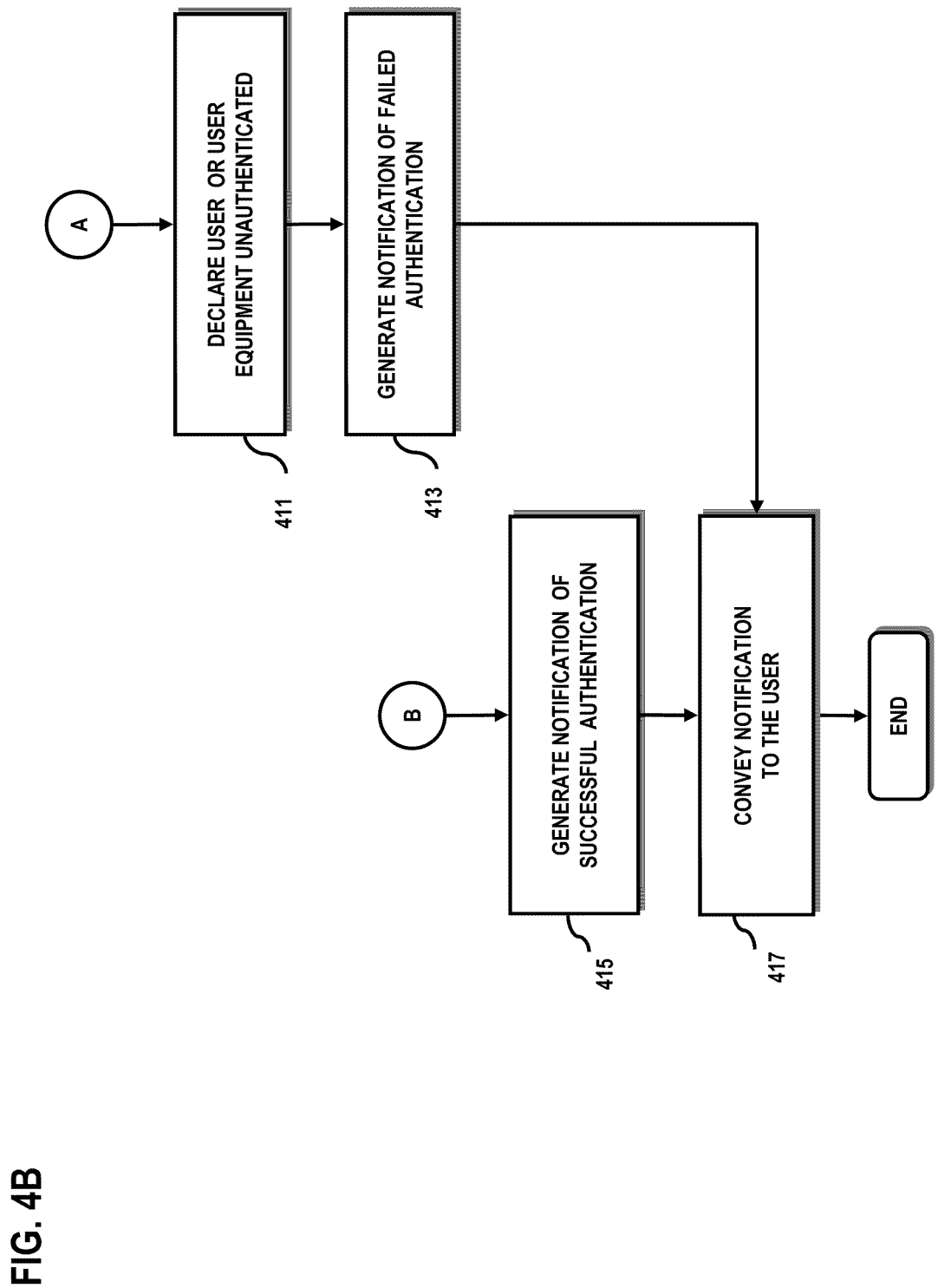

FIGS. 4A and 4B are flowcharts of an authentication process involving the interaction of a universal user authentication service and a network identity service, according to an exemplary embodiment. In this example, it is assumed that the user has set-up an account with the multifactor identification service providing by system 101, and that such account specifies various personas and authentication options. As seen in FIG. 4A, in step 401, the universal identification service, upon a request from user equipment 103, obtains a set of required data and credentials. Such data and credentials can include an equipment identifier (e.g., UE Alias), information relating to the NetID service provider, the method of authentication the user seeks, a user identifier associated with the NetID service, or a combination thereof. In step 403, the UE 101 is authenticated with the NetID service; this can involve the universal identification service sharing the received UE credentials with the NetID service. Specifically, the NetID service module 117 can validate the shared UE credentials against the stored ones in database 207 (e.g., the stored equipment identifiers (e.g., UE Alias's)).

In certain embodiments, the NetID service responds to the universal identification service with a message providing an assertion that the UE 103 is authenticated, method used for the authentication, and the expiration value (i.e., validity period).

If the UE 103 is authenticated (as determined in step 405), the universal identification service module 115 obtains a set of user credentials directly from the UE 103 (or from the user through the UE 103), and validates these credentials (per step 407) based on a comparison of stored data within database 203. If the process determines either that the user equipment (per step 405) or the user credentials (per step 409) is not authenticated or not validated, then, in step 411, the user or UE 103 is declared unauthenticated (shown in FIG. 4B). The process can then generate a notification of failed authentication, per step 413.

However, return to step 409 (of FIG. 4A), upon determining that the user credentials are valid, the process generates, per step 415 (of FIG. 4B) a notification indicating a successful authentication. For example, such notification can include a log-on message together with the network authentication method used as well as expiration value of the authentication (e.g., validity period). The expiration value may be specified by the NetID service as part of a user account setup parameter, for example. In step 417, the generated notification (either of a successful or unsuccessful authentication) is conveyed in some manner to the user. The manner of notification can include any electronic means, including email, instant communication, text messaging, etc.

According to one embodiment, if the UE 103 is not authenticated by the NetID service module 117, the universal identification service 115 can determine to re-send the request to NetID service module 117.

As discussed, according to some embodiments, the universal identification service module 115 is capable of providing the OpenID service as part of the multifactor authentication process. A user sets up an account with the OpenID service provider (i.e., module 115), whereby parameters such as personas and authentication options are specified. For example, the universal identification service module 115, as the OpenID service provider, may present a page with several login options to select as options for OpenID sign in: username/password, username/password with email verification, Transport Layer Security (TLS) or its predecessor Secure Sockets Layer (SSL) log in (requires a UE certificate); subscriber identity module (SIM) using the 3rd Generation Partnership Project (3GPP) AKA method; and others. These options may be different than the initial account authentication process used when the user established the OpenID account. In one exemplary embodiment, the user selects two factor authentication—with one factor for OpenID authentication, e.g., OpenID Identifier/password, and the second referenced as "NetID." The "NetID" option refers to the network-based authentication as provided by NetID service module 117. As explained, the NetID authentication method is dependent on the UE 103 and the access network 107; e.g., SIM EAP-AKA can be used in a wireless 3GPP network.

According to certain embodiments, to access the NetID (or the OpenID) service, the user can enter the uniform resource locator (URL) of the OpenID service provider (OP Endpoint URL) in a web browser or any other software application which enables interacting with the services 105 and the portal 209 of the multifactor authentication system 101 (specifically the universal identification service module 115). The user navigates a graphical user interface (GUI) supplied by portal 209 to select "sign in." OpenID service, via module 115, sends a sign-in page for the user to enter their OpenID Identifier. The user then enters an appropriate OpenID Identifier. OpenID service sends a page with the options the user has selected during their account set-up. The page can also provide a form with the authentication methods to select. At this point, the user can select a two factor authentication, for example, password and NetID. The user enters the OpenID credentials, e.g., password, which are credentials known by the OpenID service provider. The selection of the NetID option indicates that the OpenID service is to check the UE authentication state by querying the Network Identity service module 117. The UE authentication is performed by the NetID service module 117 according to FIG. 3. If NetID is selected, then UE 103 (e.g., via a browser) sends the OpenID credentials (e.g., password) to the OpenID service (i.e., universal identification service module 115), the URL for the NetID service (NetID URL), and the UE Identity or UE Alias.

It is contemplated that a simplification of the authentication procedure may be made by the universal identification service module 115, as the OpenID service provider, by, e.g., offering the user the first page as the same sign-in page for all users with all the options; the user enters the data for the selected options together with the OpenID Identifier in the same page.

After the user enters the requested data, the universal identification service module 115 sends an authentication request message to NetID service module 117 requesting the UE Identity or UE Alias Identity to be validated. In support of this, a secure communications channel can be either dynamically established, has been dynamically established and now made persistent, or can be established as a result of an agreement between the NetID service provider and the OpenID service provider (assuming they are different providers). After receiving the request, the NetID service module 117 responds with a message providing, for example, an assertion that the UE 103 is authenticated, method used for authentication, and an expiration period to bound the validity time ("validity period"). Alternatively, the response may be that the UE 103 is not authenticated. If the UE 103 is not authenticated, the OpenID service can request a "refresh" of the network authentication. If the UE 103 is authenticated by the NetID service module 117, the OpenID authenticates the user using the user's OpenID credentials and selected OpenID authentication method. If both authentications are successful, the OpenID service sends a logged-on message to the UE 103 presenting the network authentication method. The OpenID service module 115 generates an authentication expiration value for the lifetime of the OpenID authentication session. This value of the validity period, as mentioned, can be configured based on the expiration value received from the NetID service module 117 (if any), or a predetermined value.

Accordingly, the above arrangement permits simplification of the two-factor authentication for OpenID. Hence, the user has a single interaction with the UE 103—i.e., entering the OpenID credentials, e.g., password or PIN. The UE 103 can be provisioned with the credentials required for network authentication, the UE Identity and a shared secret between the UE and Network Identity Service, for instance. Also, the UE 103 can have the NetID URL stored for reaching the NetID service and OP Endpoint URL stored for reaching the OpenID service. Moreover, in some embodiments, the UE 103 may be provisioned with more than one URL supporting more than one OpenID service provider. If more than one OpenID service provider is provisioned, then the UE 103 can execute a try-until-success scheme c with each provider and the successful URL is stored until stale or changed by the user. The provisioned data can define a method of information exchange between the UE 103 and the universal identification service (e.g., OpenID service). In one embodiment, the first message from the UE 103 to the OpenID service module 115 initiates the network and OpenID authentication processes. This message may contain the OpenID Identifier, NetID URL, UE Alias and/or UE identity values. The OpenID service module 115 checks the network authentication with the NetID service module 117; and if authenticated, the module 115 requests the user for the user's OpenID credentials (e.g., a password). Thereafter, the OpenID service has completed the two-factor authentication, and sends a success message (or notification) to the UE 103. The UE 103 may indicate OpenID login state by, for example, a screen pop-up with text or the change in a visual icon on the desktop/display, etc.

Figure 5:
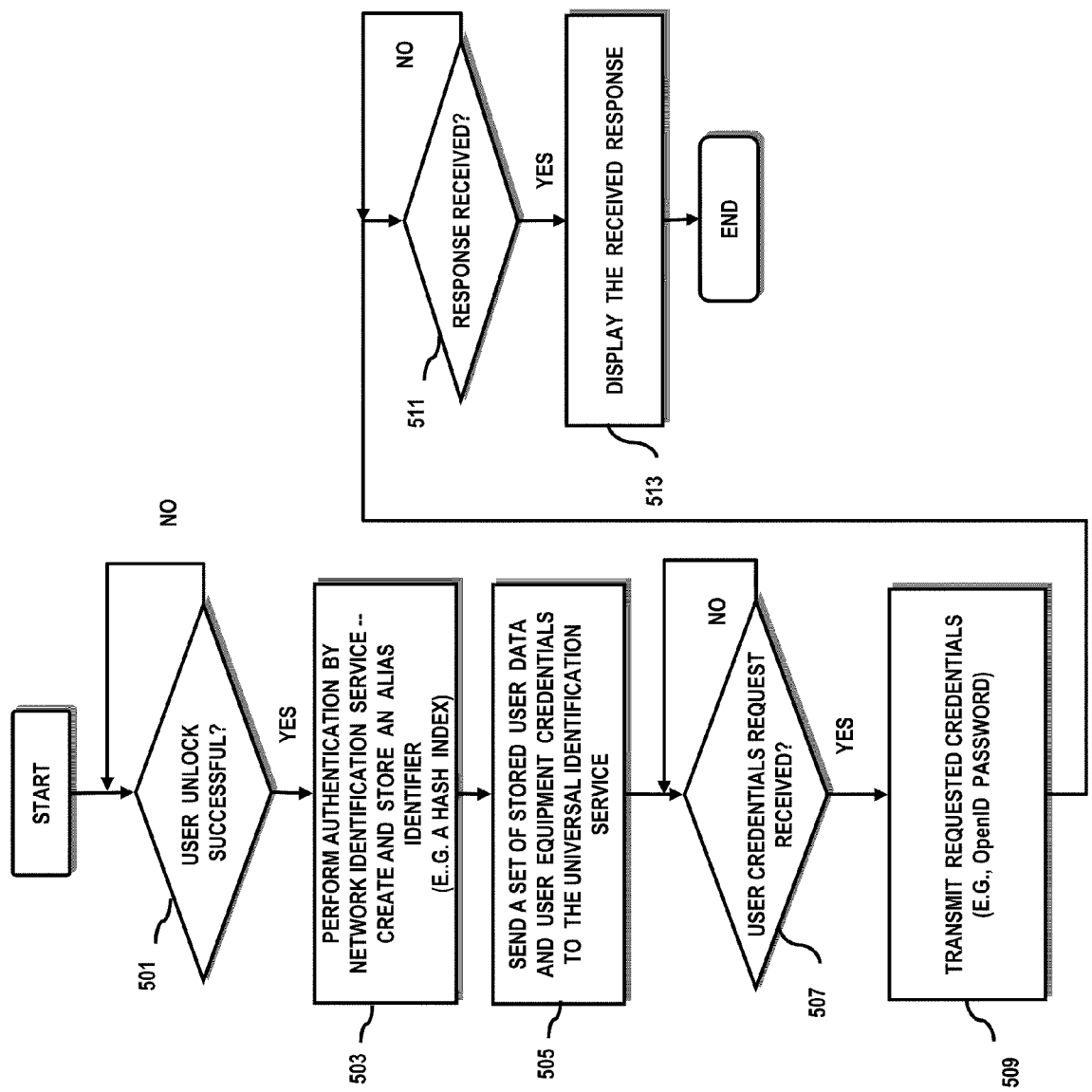
FIG. 5 is a flowchart of a process by which a user equipment is authenticated after a valid triggering event, according to an exemplary embodiment.

FIG. 5 is a flowchart of a process by which a user equipment is authenticated after a valid triggering event, according to an exemplary embodiment. By way of example, a triggering event for undergoing the multifactor authentication procedure can be based on a user "unlocking" or otherwise enabling operation of the user's device—e.g., mobile phone or PC. Many mobile phones protect unauthorized use by allowing the phone to be locked. A user, for example, can unlock the phone typically using a PIN code (Personal Identification Number). In mobile devices, the PIN acts like a password preventing other people from gaining unauthorized access to your device. Other forms of user interaction may also serve the same function such as entering a pattern on the device. In one embodiment, the PIN can stored in a SIM as well as the authentication information needed for performing the processes of FIGS. 3 and 4. Alternatively, Universal Integrated Circuit Cards (UICC) and other smart cards that securely host uniform resource locators (URLs), credentials, algorithms, and applications to execute these methods, can be employed. The user may configure the UE 103 (e.g., mobile phone) with the credentials for the universal user identifier (e.g., OpenID Identifier). In this example of FIG. 5, the user enters a PIN (or pattern) to initiate the multifactor authentication process.

After the UE 103 detects such an event, as in step 501, the UE 103 can initiate the multifactor authentication procedure by the NetID service module 117 to access to the access network 107. In step 503, authentication is performed by the network identification service module 117, in which an alias identifier is generated (e.g., using a hashing operation). In particular, the NetID service module 117 in conjunction with the UE 103 can create an UE alias, whereby the UE 103 can store locally for subsequent use. Also, according to certain embodiments, UE 103 possesses other authentication information—e.g., user ID and user credentials.

In one embodiment, the UE 103 can be provisioned with the credentials required for network authentication. These credentials can include the UE Identity and a shared secret between the UE and NetID Service, for instance, the NetID URL stored for reaching the Network Identity Service and OpenID Service Provider Endpoint URL stored for reaching the OpenID Service Provider. Moreover, the provisioned data can indicate the method of information exchange between the UE 103 and the OpenID service provider.

In step 505, the UE 103 sends user equipment credentials (along with other stored user data) to the universal identification service module 115, which generates a request for user credentials from the UE 103 upon validation of the UE 103 (as described with respect to FIGS. 4A and 4B).

In step 507, the process determines whether the request for the user credentials is received from the module 115. The requested credentials can be stored in the UE or can be prompted to the user to enter. An example of such a set of credentials is OpenID credentials, e.g., password or PIN. It is noted that if the UE authentication fails at this point, no such request will be generated, and that an appropriate notification can be provided to the user. Assuming this initial UE authentication is successful, upon receipt of such credentials, the UE 103 can transmit the requested user credentials to the universal identification service module 115, per step 509. Next, the UE 103 waits for a response from the module 115, as in step 511, regarding whether the user credentials are valid or not to permit the UE 103 to access one or more of the services 105. The response (either successful or failed authentication) is then displayed, as in step 513.

If the failure is due to the UE 103 not being authenticated, the response can specify a "UE unauthenticated" message; and if the UE 103 is authenticated (but the user is not authenticated), then an appropriate message can be shown. If (the two factor) authentication is successful, a message including expiration time can be displayed.

The above processes and arrangement, in certain embodiments, advantageously provide a strong authentication process that is convenient for users to access a multiple of on-line and/or network services. For example, a two-factor authentication approach is supported, whereby the user need only enter a single item (e.g., a PIN) to access the network 107 and then services 105.

The processes described herein for authentication using a multifactor approach may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
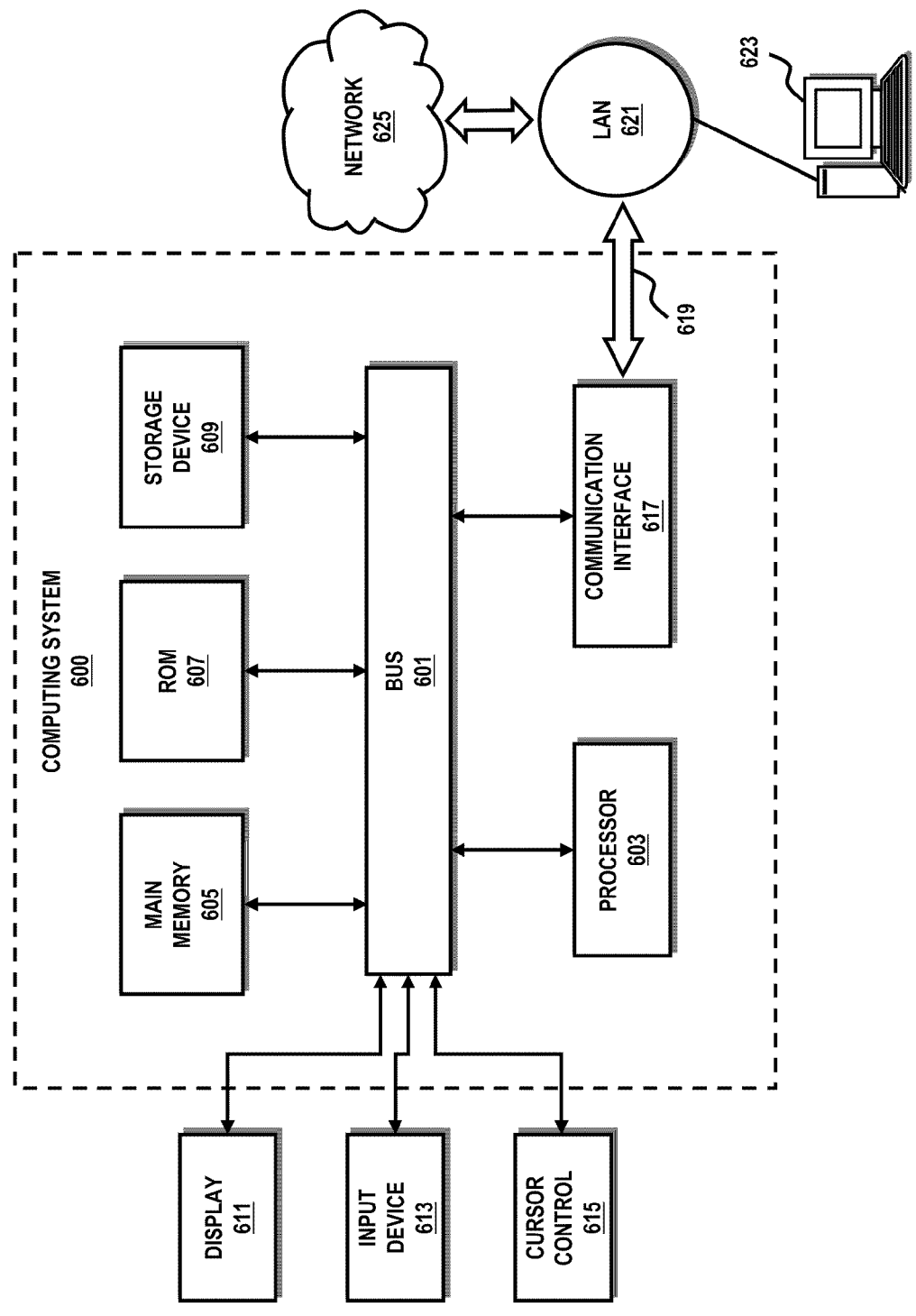
FIG. 6 is a diagram of a computer system that can be used to implement various exemplary embodiments.

FIG. 6 illustrates computing hardware (e.g., computer system) 600 upon which exemplary embodiments can be implemented. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to an exemplary embodiment, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement exemplary embodiments. Thus, exemplary embodiments are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an exemplary embodiment through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 7:
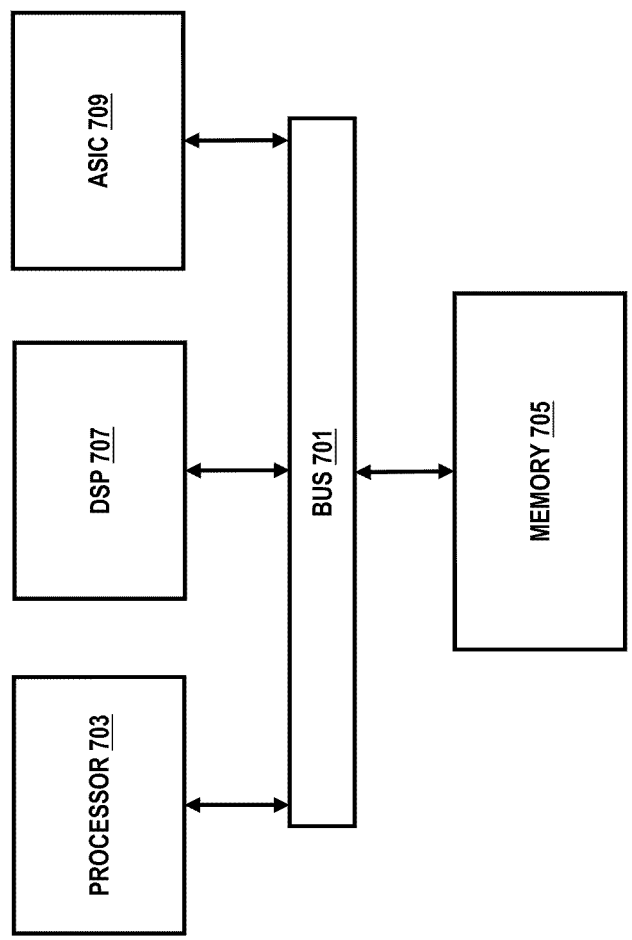
FIG. 7 is a diagram of a chip set that can be used to implement various exemplary embodiments.

FIG. 7 illustrates a chip set 700 upon which an embodiment of the invention may be implemented. Chip set 700 is programmed to present views and manage cutover events as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 700, or a portion thereof, constitutes a means for performing one or more steps of FIGS. 3-5.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to providing multifactor authentication. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:

determining, via a processor, whether a user equipment has been authenticated for an access network;

receiving an identifier corresponding to the user equipment; and when the user equipment is authenticated for the access network, generating, via a processor, an alias identifier based on the received identifier corresponding to the user equipment for use in combination with a universal user identifier to authenticate a user corresponding to the user equipment for accessing a plurality of services via the access network, wherein the user equipment is a computing device that communicates over the access network, and wherein the alias identifier is generated by performing a hashing operation on the received identifier corresponding to the user equipment, and the access network is a wireless network, the services including a web-based service or a network service.

2. The method according to claim 1, further comprising:

storing the generated alias identifier within local memory; and initiating transmission of the generated alias identifier to the user equipment for storage therein.

3. The method according to claim 2, further comprising:

communicating with a universal identification service module to validate the user equipment based on the alias identifier stored within the user equipment, wherein the universal identification service module is configured to assign the universal user identifier to the user.

4. The method according to claim 1, further comprising:

assigning a validity period to the alias identifier that specifies an expiration value for the alias identifier.

5. An apparatus comprising:

at least one processor; and at least one memory including computer program code, the at least one memory and the computer program code configured to, with the at least one processor, cause the apparatus to perform at least the following, determine that a user equipment has been authenticated for an access network;

receive an identifier corresponding to the user equipment; and when the user equipment is authenticated for the access network, generate an alias identifier based on the received identifier corresponding to the user equipment for use in combination with a universal user identifier to authenticate a user corresponding to the user equipment for accessing a plurality of services via the access network, wherein the user equipment is a computing device that communicates over the access network, and wherein the alias identifier is generated by performing a hashing operation on the received identifier corresponding to the user equipment, and the access network is a wireless network, the services including a web-based service or a network service.

6. The apparatus according to claim 5, wherein the apparatus is further caused, at least in part, to:

store the generated alias identifier within local memory; and initiate transmission of the generated alias identifier to the user equipment for storage therein.

7. The apparatus according to claim 6, wherein the apparatus is further caused, at least in part, to:

communicate with a universal identification service module to validate the user equipment based on the alias identifier stored within the user equipment, wherein the universal identification service module is configured to assign the universal user identifier to the user.

8. The apparatus according to claim 5, wherein the apparatus is further caused, at least in part, to:

assign a validity period to the alias identifier that specifies an expiration value for the alias identifier.

9. A method comprising:

receiving an equipment identifier of a user equipment from the user equipment;

forwarding the equipment identifier to a network identity service module for authenticating the user equipment to permit access on a communication network, wherein the network identity service module is configured to manage the equipment identifier;

when the user equipment is authenticated by the network identity service, receiving a universal user identifier associated with a user of the user equipment, wherein the universal user identifier provides access to a plurality of services; and authenticating the user based on the universal user identifier to access one or more of the plurality of services, wherein the user equipment is a computing device that communicates over the communication network, and wherein the equipment identifier is an alias identifier that is generated by performing a hashing operation on the received equipment identifier of the user equipment, and the communication network is a wireless network, the services including a web-based service or a network service.

10. The method according to claim 9, wherein the network identity service module authenticates the user equipment by retrieving a stored version of the alias identifier for comparison with an alias identifier provided by the user equipment.

11. The method according to claim 9, further comprising:

generating a request for one or more credentials from the user equipment, wherein the credentials include the alias identifier and the universal user identifier.

12. The method according to claim 11, wherein the credentials further include a user password and address of a portal for the network identity service module.

13. An apparatus comprising:

at least one processor; and at least one memory including computer program code, the at least one memory and the computer program code configured to, with the at least one processor, cause the apparatus to perform at least the following, receive an equipment identifier of a user equipment from the user equipment;

forward the equipment identifier to a network identity service module for authenticating the user equipment to permit access on a communication network, wherein the network identity service module is configured to manage the equipment identifier;

when the user equipment is authenticated by the network identity service, receive a universal user identifier associated with a user of the user equipment, wherein the universal user identifier provides access to a plurality of services; and authenticate the user based on the universal user identifier to access one or more of the plurality of services, wherein the user equipment is a computing device that communicates over the communication network, and wherein the equipment identifier is an alias identifier that is generated by performing a hashing operation on the received equipment identifier of the user equipment, and the communication network is a wireless network, the services including a web-based service or a network service.

14. The apparatus according to claim 13, wherein the network identity service module authenticates the user equipment by retrieving a stored version of the alias identifier for comparison with an alias identifier provided by the user equipment.

15. The apparatus according to claim 13, wherein the apparatus is further caused, at least in part, to:
generate a request for one or more credentials from the user equipment, wherein the credentials include the alias identifier and the universal user identifier.

16. The apparatus according to claim 15, wherein the credentials further include a user password and address of a portal for the network identity service module.

* * * * *